Oct. 17, 1939.   F. E. ANDERSON   2,176,519
SWIVEL
Filed Oct. 26, 1937

Inventor
Fred E Anderson

By Clarence A O'Brien
Hyman Berman
Attorneys

Patented Oct. 17, 1939

2,176,519

UNITED STATES PATENT OFFICE 2,176,519

SWIVEL

Fred E. Anderson, Portland, Oreg.

Application October 26, 1937, Serial No. 171,161

2 Claims. (Cl. 287—87)

This invention appertains to new and useful improvements in mechanical elements and more particularly to a novel form of swivel.

The principal object of the present invention is to provide a swivel construction which will afford a multiplicity of connections thereto not now attainable with other kinds of swivels.

Another important object of the invention is to provide a swivel which will permit a multiplicity of connections thereto.

These and various other important objects and advantages of the invention will become apparent to the reader of the following specification.

Figure 1:
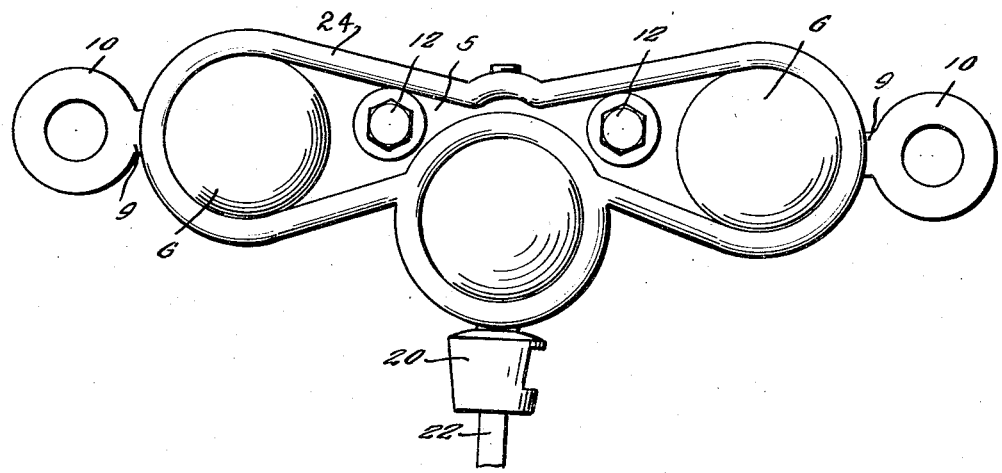
Figure 1 represents a side elevational view of the swivel.
Figure 2:
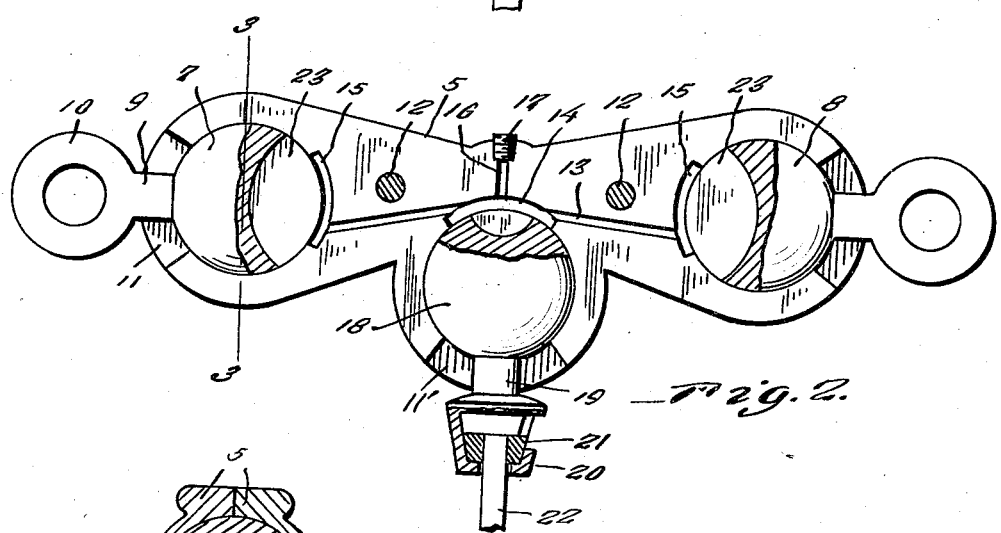
Figure 2 is a longitudinal sectional view through the swivel.
Figure 3:
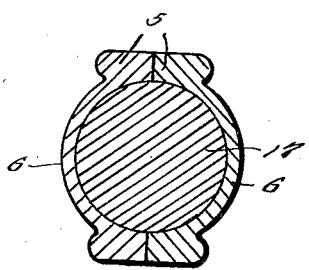
Figure 3 is a section on the line 3—3 of Figure 2.

Referring to the drawing wherein like numerals designate like parts, it can be seen that the swivel shell is made up of a pair of plate members 5—5. These members 5—5 are of elongated construction and flare outwardly at their end portions where they are formed into hemispherical socket portions 6, so that when the sections 5—5 are brought together sockets are afforded for the end balls 7—8. Each of these balls 7—8 is provided with a shank 9 and an eye 10, and these shanks 9 operate in the slots 11 which form a slideway for the shanks when the sections 5—5 are bolted together by the bolts 12.

The opposed faces of the sections 5—5 are provided with grooveways 13 extending from the pockets 14 to the pockets 15 which merge with the ball socket. The pockets 14 of the sections 5 form a single lubricant receiving chamber when the sections are together and into this extends the duct 16 which is normally closed by the screw plug 17.

The intermediate portion of each of the sections 5 is provided with a depending portion of hemispherical shape defining socket half portions which when brought together form a socket for the intermediate ball 18 which has the shank 19 extending therefrom and carrying the socket 20 in which the head formation 21 of a rod 22 can seat.

The balls 7, 8 and 18 have pockets 23 at their innermost portions for collecting lubricant from the pockets 15 and 14. The plates are also provided with reinforcing ribs 24 on their outer faces adjacent the edges of the plates and these ribs not only act to reinforce the plates but they also provide thickened portions through which the slots 11 and the slots 11' for the shank 19, pass.

While the foregoing specification sets forth the invention in specific terms, it is to be understood that numerous changes in the shape, size and materials may be resorted to without departing from the spirit and scope of the invention as claimed hereinafter.

Having described the invention what is claimed as new is:

1. A swivel device of the class described comprising a pair of elongated companion plates having their ends rounded and each plate having a rib on its outer face adjacent the edges of the plate, means for connecting the plates together and each plate having substantially semispherical recesses in its end portions opening out through the inner face of the plate with the convex portions formed by the recesses having their outer portions surrounded by portions of the rib and the end portions of each plate having elongated arcuate slots therein, each slot having its inner edge communicating with a recess and its outer portion extending through an end edge of the plate, each plate on its inner face having arcuate grooves therein communicating with the inner portions of the recesses and another groove connecting the last-mentioned grooves together, the recesses, slots and grooves of one plate registering with those of the other plate when the plates are fastened together, the recesses forming spherical sockets adjacent the ends of the plates when the plates are connected together, a ball in each socket, a shank connected with each ball and passing through the slots at the ends of the two plates, each ball having a recess therein in communication with the inner arcuate groove and said plates having a passage forming groove therein in communication with the connecting grooves for introducing lubricant thereinto.

2. A swivel device of the class described comprising a pair of elongated companion plates having their ends rounded and each plate having a rib on its outer face adjacent the edges of the plate, means for connecting the plates together and each plate having substantially semispherical formed recesses in its ends and intermediate portions opening out through the inner face of the plates with the convex portions formed by the recesses having thier outer portions surrounded by portions of the rib and the end and intermediate portions of each plate having elongated arcuate slots therein, each slot having its inner edge communicating with a recess and its outer portion extending through an edge of the plate, each plate on its inner face having arcuate grooves therein communicating with the inner portions of the recesses and another groove connecting the last-mentioned grooves together, the recesses, slots and grooves of one plate registering with those of the other plate when the plates are fastened together, the recesses forming spherical sockets adjacent the ends and intermediate portions of the plates when the plates are connected together, a ball in each socket, a shank connected with each ball and passing through the slots at the ends and intermediate portions of the two plates, each ball having a recess therein in communication with the inner arcuate groove and said plates having a passage forming groove therein in communication with the connecting grooves for introducing lubricant thereinto.

FRED E. ANDERSON.